US012812466B2

(12) United States Patent
Lee

(10) Patent No.: US 12,812,466 B2
(45) Date of Patent: Nov. 24, 2026

(54) METHOD FOR FORWARDING AGGREGATED PACKETS AND CIRCUIT SYSTEM

(71) Applicant: REALTEK SEMICONDUCTOR CORP., Hsinchu (TW)

(72) Inventor: Chen-Wei Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 286 days.

(21) Appl. No.: 18/823,878

(22) Filed: Sep. 4, 2024

(65) Prior Publication Data

US 2025/0220505 A1 Jul. 3, 2025

(30) Foreign Application Priority Data

Dec. 27, 2023 (TW) ................................ 112150894

(51) Int. Cl.
*H04W 28/06* (2009.01)
*H04W 84/12* (2009.01)

(52) U.S. Cl.
CPC .......... *H04W 28/065* (2013.01); *H04W 84/12* (2013.01)

(58) Field of Classification Search
CPC ............................ H04W 28/065; H04W 84/12
See application file for complete search history.

(56) References Cited

U.S. PATENT DOCUMENTS 9,407,734 B2 8/2016 Ashokan et al.
2014/0269766 A1 9/2014 Gopalasetty et al.
2015/0003466 A1 * 1/2015 Soffer .................. H04L 47/125 370/412
2024/0259304 A1 8/2024 Lee

FOREIGN PATENT DOCUMENTS

TW 202343996 A 11/2023

* cited by examiner

*Primary Examiner* — Duc C Ho
(74) *Attorney, Agent, or Firm* — Li & Cai Intellectual Property (USA) Office

(57) ABSTRACT

A method for forwarding aggregated packets and a circuit system are provided. In the method performed by the circuit system, after receiving multiple data frames, the data frames are converted to data frames with a unified wireless local area network standard. The header of the data frames is inserted with de-aggregation information so as to form subframes. In the meantime, an aggregation circuit is used to aggregate the multiple subframes so as to form multiple aggregated frames according to aggregation rules. Afterwards, a reorder procedure is performed on the aggregated frames based on sequence numbers of the aggregated frames, and the duplicate frames are also marked for a subsequent de-aggregation procedure to ignore the duplicate frames. The reordered aggregated frames are then outputted to a second-layer forwarding procedure in sequence for generating the packets to be forwarded after the aggregated frames are de-aggregated.

20 Claims, 8 Drawing Sheets

METHOD FOR FORWARDING AGGREGATED PACKETS AND CIRCUIT SYSTEM

CROSS-REFERENCE TO RELATED PATENT APPLICATION

This application claims the benefit of priority to Taiwan Patent Application No. 112150894, filed on Dec. 27, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for forwarding aggregated packets, and more particularly to a method for firstly aggregating the received wireless network packets and the forwarding the aggregated packets, and a circuit system for performing the method.

BACKGROUND OF THE DISCLOSURE

With the evolution of network transmission specifications, transmission rates should technically become higher. However, since a common network device (e.g., a WiFi™ router) generally operates an embedded system with a limited operating performance, the limited operating performance of a processor of the network device will affect the transmission rate of network packets, and especially affect the transmission applications between the Internet and a wireless local area network (WLAN).

Furthermore, the complexity of the wireless network communication protocol (e.g., WiFi™) increases processor load required for forwarding the network packets to a certain extent, and also affects performance of the network router. Therefore, it becomes a big challenge for a wireless access point (AP) or a router with a limited hardware resource to reach a maximum performance.

SUMMARY OF THE DISCLOSURE

In response to the above-referenced technical inadequacies, the present disclosure provides a method for forwarding aggregated packets and a circuit system that can improve the efficiency of forwarding packets in compliance with a specific wireless network communication protocol and adapt to a network device with limited storage capacity and low computing capability.

The circuit system is configured to perform the method for forwarding aggregated packets. Main circuit components of the circuit system include a wireless network interface controller and a wireless network interface card driver. In the method, the wireless network interface controller receives multiple data frames and converts the data frames to be in compliance with a unified wireless local area network standard. In an aggregation procedure, de-aggregation information is added to a header of the multiple data frames so as to generate multiple aggregated frames. Afterwards, the wireless network interface card driver performs a reorder procedure on the multiple aggregated frames based on sequence numbers of the aggregated frames. The reordered aggregated frames are sequentially outputted. Next, a second-layer forwarding procedure is performed for generating packets to be forwarded by de-aggregating the multiple aggregated frames.

The circuit system uses a reorder to perform the reorder procedure and the circuit system checks whether or not any duplicate data frame exists in each of the aggregated frames in the reorder procedure. If any duplicate data frame exists, the duplicate data frame is labeled in the header for being ignored when de-aggregation is performed.

Further, the reorder relies on sequence numbers of a first data frame and a last data frame of each of the aggregated frames to determine the duplicate data frame and label the duplicate data frame in the header for dropping the duplicate data frame when performing de-aggregation.

Still further, the second-layer forwarding procedure is performed by a processor of the circuit system, or by the wireless network interface controller operated at an output end of a network device.

Further, the aggregation procedure is performed only on the data-type data frames. The circuit system sets an upper limit of quantity for performing aggregation on a certain quantity of the data frames at one time and an upper limit of length for a total length of all of the data frames to be processed. The aggregation procedure will be aborted when the quantity of the data frames to be aggregated at one time meets the upper limit of quantity, or the total length of all of the data frames to be processed at one time meets the upper limit of length.

Still further, the wireless network interface controller is disposed at RX of the circuit system and receives the IEEE802.11 standard MAC protocol data unit (MPDU) data frames via a wireless network interface. Next, when the multiple data frames are converted to be in compliance with a unified wireless local area network. The circuit system then checks whether or not the IEEE802.11 standard data frames are the Aggregate MAC Service Data Unit (AMSDU) data frames. If the IEEE802.11 standard data frames are determined to be the AMSDU data frames, the AMSDU data frames are de-aggregated to be multiple IEEE802.3 standard MSDU (MAC Service Data Unit) data frames. Otherwise, if the IEEE802.11 standard data frames are not the AMSDU data frames, the IEEE802.11 standard data frames are converted to IEEE802.3 standard MSDU data frames.

Further, the de-aggregation information is added to the header of each of the IEEE802.3 standard MSDU (MAC Service Data Unit) data frames so as to generate subframes that combine the de-aggregation information and the IEEE802.3 standard MSDU data frames. When multiple subframes are generated, an aggregation circuit relies on an aggregation rule to aggregate the multiple subframes to be the aggregated frame, and the aggregated frames are transmitted to the wireless network interface card driver for further processing.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
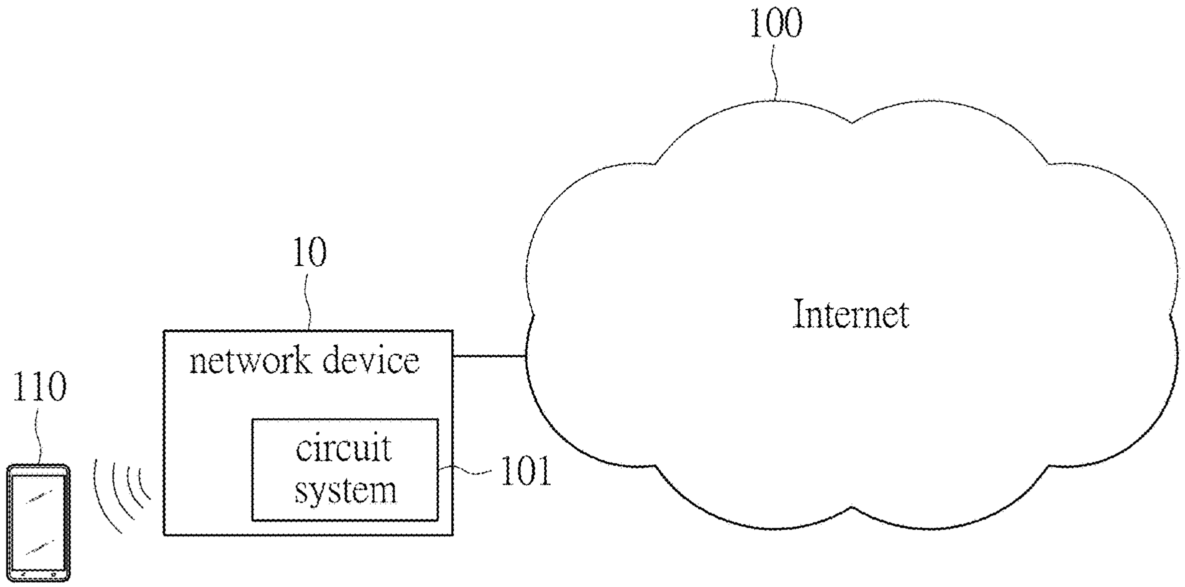
FIG. 1 is a schematic diagram illustrating an instance of a method for forwarding aggregated packets being performed.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

For a specific wireless network communication protocol (e.g., WiFi™), the present disclosure provides the method for forwarding aggregated packets and the circuit system for performing the method. The circuit system can be a control circuit that operates the wireless network communication protocol. In another aspect, the packet-aggregation mechanism is provided for the circuit system that can be a control integrated circuit (IC) for operating the wireless network communication protocol (e.g., an IC for WiFi™ protocol) and only having a limited storage space. In the packet-aggregation mechanism also includes a packet-aggregation-based reordering aspect. Therefore, even if the wireless network communication protocol will encounter packet error rate, the aggregated packets can still be reordered effectively and applied to a packet-aggregation-based forwarding mechanism. Accordingly, the performance of the circuit system can be improved.

In one embodiment of the present disclosure, the method for forwarding aggregated packets is appropriately applied to a network device with limited computing performance. Reference is made to FIG. 1, which is a schematic diagram illustrating an instance that operates the method for forwarding aggregated packets.

In FIG. 1, a local network device 10 is provided. The network device 10 can be any network device that is able to forward network packets. For example, the network device 10 can be an access point (AP), a router or a network switch. The network device 10 generally adopts an embedded system but not a high performance processor. However, for processing network packet transmission with more higher transmission rate, a processor of the network device 10 needs a more efficient operating mode since the processor is required to satisfy a specific data rate.

As the diagram shows, the network device 10 establishes a local network at a local side for providing a user device 110 in the local network to link to a packet forwarding service of Internet 100. The method for forwarding aggregated packets is operated in a circuit system 101 of the network device 10. The method is used for implementing a packet-aggregation mechanism that is belonging to a wireless local area network (e.g., WiFi™). In certain embodiments, the circuit system of the network device 10 operates the embedded system that performs a specific wireless network communication protocol. One of the tasks of the wireless network communication protocol is to forward the network packets and parses the received network packets of data frames in accordance with the wireless network communication protocol so as to acquire a source and destination network addresses. After that, a routing algorithm is used to determine a forwarding route.

Figure 2:
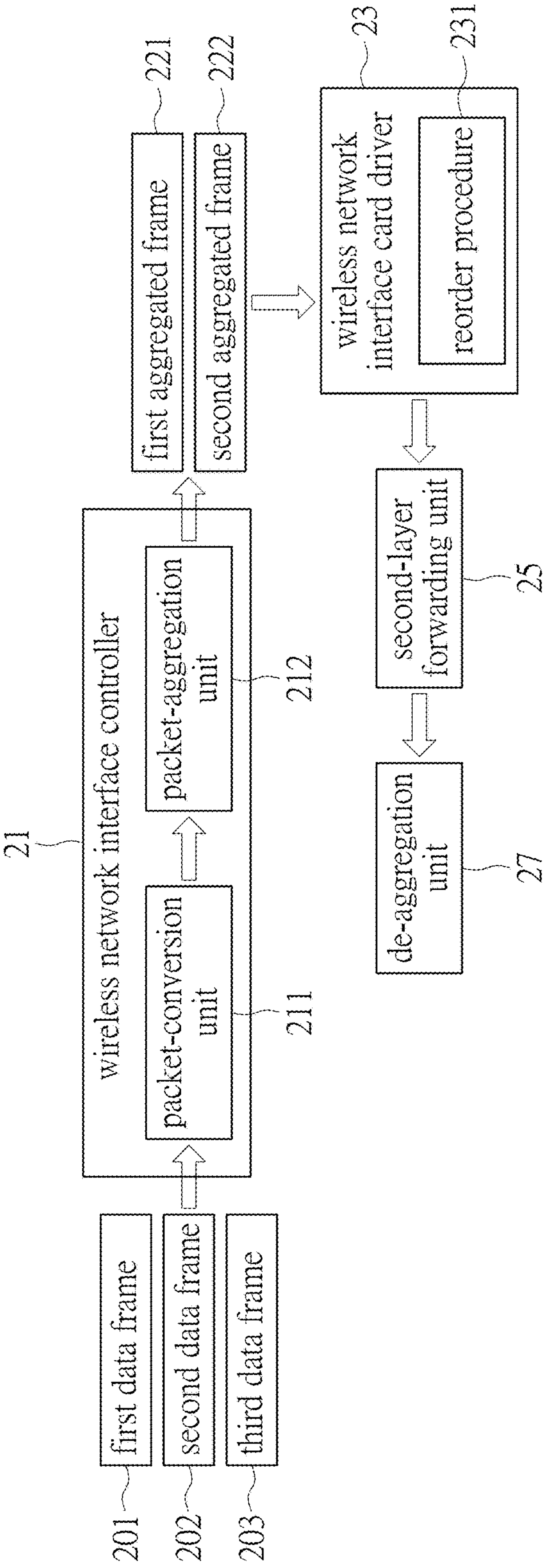
FIG. 2 is a schematic diagram depicting a framework of a circuit system that operates the method for forwarding aggregated packets according to one embodiment of the present disclosure.
Figure 3:
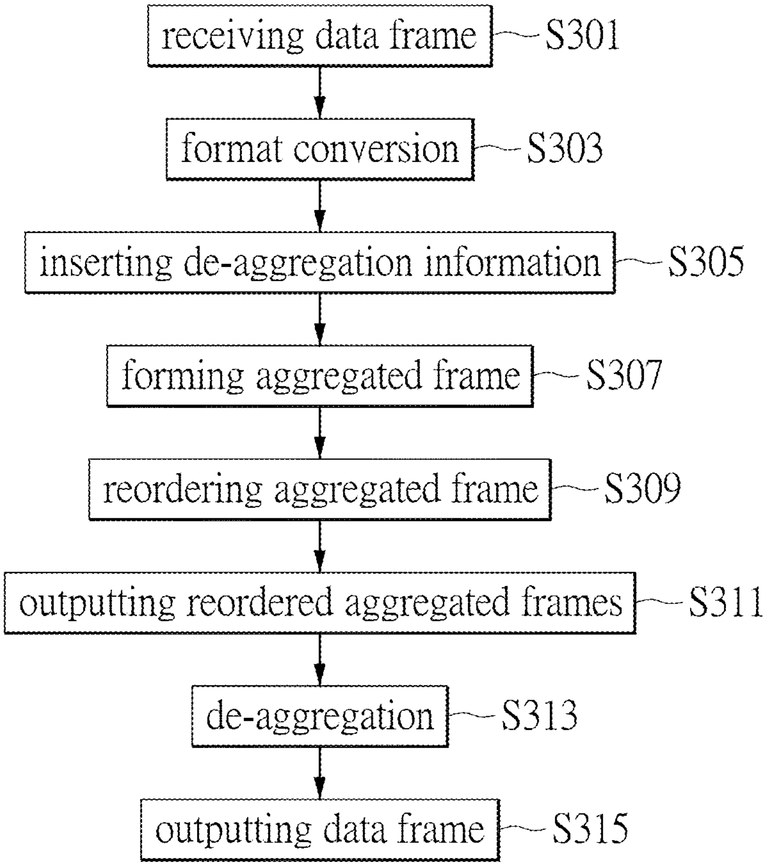
FIG. 3 is a flowchart illustrating the method for forwarding aggregated packets according to one embodiment of the present disclosure.

One of the aspects of the method for forwarding aggregated packets is to provide a solution for a receiver (RX) of the network device 10 to more efficiently forward network packets. Reference is made to FIG. 2, which is a schematic diagram illustrating a framework of the circuit system according to one embodiment of the present disclosure, and in which a process of processing packet aggregation of the network packets in the circuit system is also provided. Reference is also made to FIG. 3, which is a flowchart illustrating the method for forwarding aggregated packets according to one embodiment of the present disclosure.

It should be noted that, in the field of art relating to a computer network and communication, the data frames to be transmitted between a transmitter (TX) and the receiver (RX) are the network packets having a frame synchronization sequence, and the data frames are the layer 2 (L2, the data link layer) data packets in compliance with an open system interconnection (OSI) model. The frame synchronization sequence is composed of a series of bits that indicate a start and an end of payload of the data frame. At the transmitter, the data is encapsulated so as to form a series of data frames to be transmitted to the receiver (RX). At the receiver (RX), the circuit system provided in the present disclosure is used to perform the actions such as data frame conversion, aggregation, reordering, forwarding and de-aggregation. These actions can be embodied by a circuitry and software.

FIG. 2 shows main components such as a wireless network interface controller (NIC) 21 and a wireless network interface card driver 23 of the circuit system. The wireless network interface controller 21 and the wireless network interface card driver 23 can be interconnected in a circuit or communicated via signals. In an aspect of the circuit system, the wireless network interface controller 21 is implemented by an integrated circuit for forwarding the wireless network packets in the network device, and the wireless network interface card driver 23 can be a circuit element of the network device or a software element operated in the processor of the network device.

The wireless network interface controller 21 includes a packet-conversion unit 211 and a packet-aggregation unit 212. The wireless network interface controller 21 is used to process the network packets at RX. The packet-conversion unit 211 is used to perform format conversion of the network packets, for example, the network packets can be converted to MAC Service Data Unit (MSDU) data frames in accordance with a wireless local area network standard (e.g., IEEE802.3). The packet-aggregation unit 212 is used to add de-aggregation information in a header of the network packets.

According to one embodiment of the present disclosure, for providing a more efficient processing procedure, such as in the aggregation procedure, the packet-aggregation unit 212 can only aggregate the data-type data frames but not aggregate management frames and null frames that may be used for other purposes.

It should be noted that, since the computing resources of the circuit system are limited, such as the limited memory capability that affects capability of data queue, the circuit system can be configured to set an upper limit of quantity for performing aggregation on a certain quantity of the data frames at one time and an upper limit of length for a total length of all of the data frames to be processed. That means that the aggregation procedure will be aborted when the quantity of the data frames to be aggregated at one time meets the upper limit of quantity, or the total length of all of the data frames to be processed at one time meets the upper limit of length.

In the beginning, the network device receives wireless network signals via a wireless network interface, and the wireless network signals are the network packets transmitted by a wireless network circuit of the transmitter. In general, the wireless network circuit of the transmitter fragments the MSDU data frames into MPDU (MAC (media access control) protocol data unit) data frames in compliance with a specific wireless local area network standard (e.g., IEEE802.11). The MPDU data frames are transmitted to the receivers via network, and the circuit of the receiver combines the received MPDU data frames to be the original MSDU data frames.

For the circuit system, the wireless network interface controller 21 of the circuit system receives the multiple data frames such as a first data frame 201, a second data frame 202 and a third data frame 203 shown in the diagram (step S301). The data frames are converted to be with a unified format by the packet-conversion unit 211 (step S303), and then undergo an aggregation procedure, in which the packet-aggregation unit 212 adds de-aggregation information in a header of the data frames (step S305) so as to generate multiple aggregated frames such as a first aggregated frame 221 and a second aggregated frame 222 shown in the diagram (step S307). After that, the wireless network interface card driver 23 of the circuit system can perform an aggregation-based reorder procedure on the multiple out-of-order aggregated frames based on the sequence numbers recorded in the data frames by an aggregation-based reorder 231. It should be noted that the circuit system checks whether or not any duplicate data frame exists in the multiple data frames when performing the reorder procedure. If any duplicate data frame exists, the duplicate data frame will be labeled in the header of the data frames to enable a back-end to ignore the duplicate data frame in order to avoid unnecessary process when performing de-aggregation.

When the network packets format conversion is completed, the wireless network interface card driver 23 adds the de-aggregation information to the header of the data frames, and performs aggregation-based order procedure on the data frames based on the sequence numbers of the aggregated frames. When the aggregated frames have been reordered (step S309), the reordered aggregated frames are outputted to a second-layer forwarding unit 25 of the circuit system in an order (step S311). The second-layer forwarding unit 25 can be used to perform a second-layer forwarding procedure in the processor of the circuit system or the second-layer forwarding procedure operated in a wireless network interface controller (WNIC) at an output end of the network device. Afterwards, a de-aggregation unit 27 of the output end wireless network interface controller is used to de-aggregate the aggregated frames having the de-aggregation information (deagg_info) so as to generate the packets to be forwarded (step S313). The packets are then forwarded to a next network node according to a destination recorded in the header of the data frames (step S315). The destination network address can be acquired by parsing the network packets, and the packets are forwarded according to a forwarding route in accordance with the destination network address.

Figure 4:
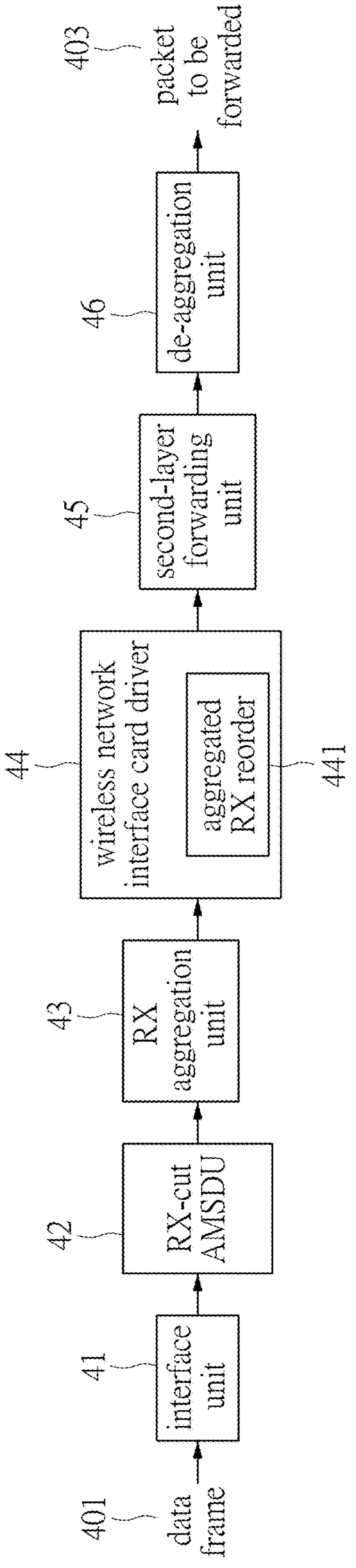
FIG. 4 is a schematic diagram depicting the circuit system that operates the method for forwarding aggregated packets in one embodiment of the present disclosure.
Figure 5:
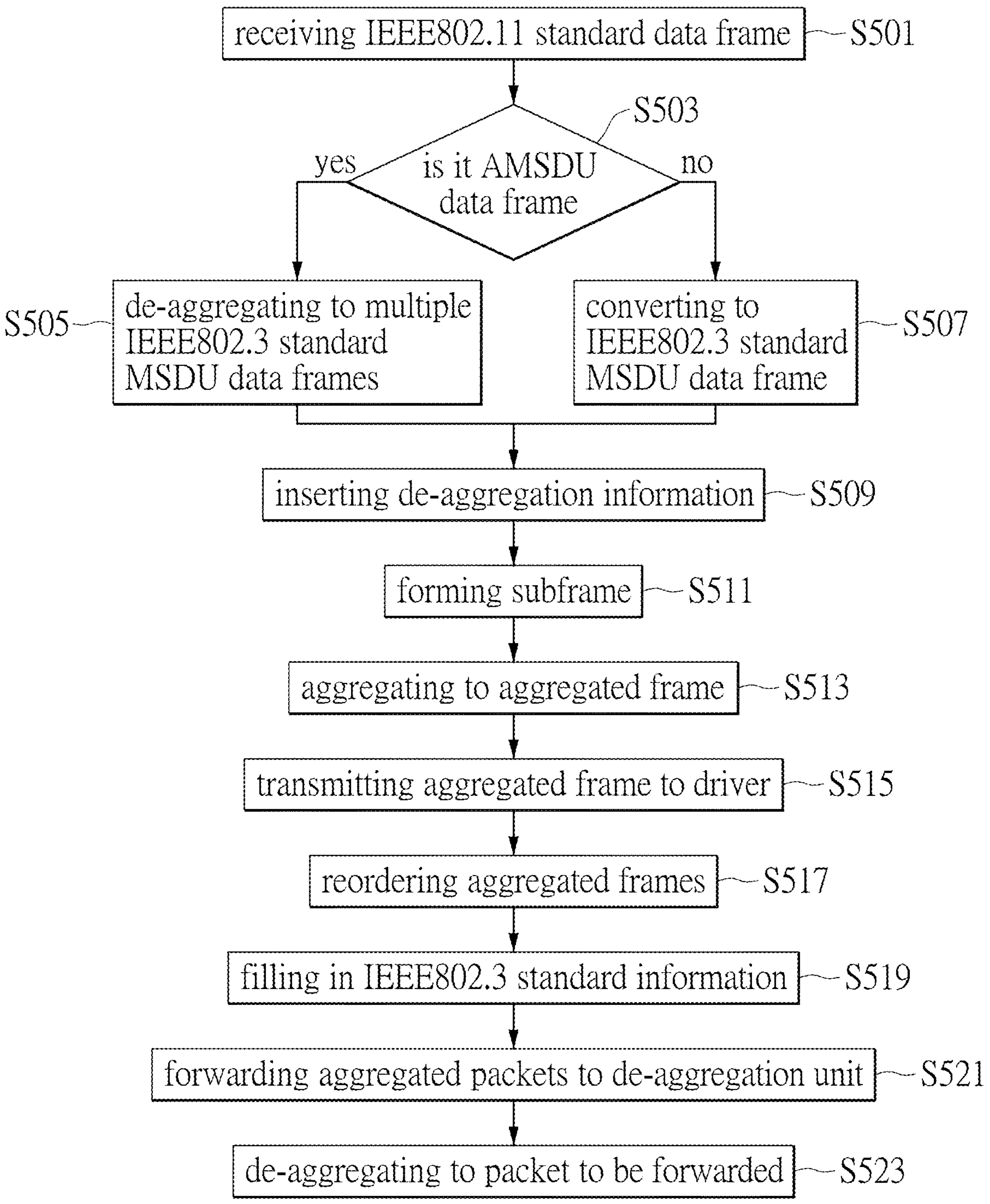
FIG. 5 is another flowchart illustrating the method for forwarding aggregated packets according to another embodiment of the present disclosure.

According to one of the embodiments of the method for forwarding aggregated packets, and referring to a schematic diagram of the circuit system of FIG. 4 as well as a flowchart illustrated in FIG. 5, the elements such as an RX-cut Aggregate MAC Service Data Unit (AMSDU) 42, an RX aggregation unit 43, and a wireless network interface card driver 44 (e.g., including an aggregated RX reorder 441, a second-layer forwarding unit 45 and a de-aggregation unit 46) of the receiver (RX) of the circuit system can be implemented by circuits or software.

The wireless network interface controller of the receiver (RX) is used to receive the MPDU data frames 401 in compliance with IEEE802.11 standard via an interface unit 41 that can be a wireless network interface (step S501). It should be noted that each of the MPDU data indicates a data frame. After that, the RX-cut Aggregate MAC Service Data Unit 42 performs format conversion on the IEEE802.11 standard data frames. One of the tasks of the RX-cut Aggregate MAC Service Data Unit 42 is to check whether or not the IEEE802.11 standard data frames are the AMSDU data frames, namely the aggregated MSDU data frames (step S503). If the IEEE802.11 standard data frames are determined to be the AMSDU data frames (represented as "yes"), the AMSDU data frames are de-aggregated to be multiple MSDU data frames in compliance with IEEE802.3 standard (step S505); otherwise, if the IEEE802.11 standard data frames are determined not the AMSDU data frames (represented as "no"), the IEEE802.11 standard data frames are converted to the MSDU data frames in compliance with IEEE802.3 standard (step S507).

Another task of the RX-cut Aggregate MAC Service Data Unit (AMSDU) 42 is to add the de-aggregation information to a header of the IEEE802.3 standard MSDU data frames (step S509), and the back-end de-aggregation element can rely on the de-aggregation information to generate the subframes that combine the de-aggregation information with the IEEE802.3 standard MSDU data frames. The subframes are then transmitted to the RX aggregation unit 43 (step S511).

It should be noted that the MSDU subframes are formed by adding the header to the network layer MSDU data frames (MSDU). The multiple MSDU subframes can be aggregated to be a set of aggregated MSDU data frames. The above-mentioned RX-cut Aggregate MAC Service Data Unit is used to perform format conversion on the IEEE802.11 standard data frames in an aggregation procedure, and add the de-aggregation information to the header of the MSDU data frames. However, when the software or hardware in charge of forwarding packets of the circuit system already supports the IEEE802.3 standard packets that are converted from the aggregated MSDU data frames, the circuit system does not need to install the RX-cut Aggregate MAC Service Data Unit.

Afterwards, when an aggregation circuit at RX (e.g., the RX aggregation unit 43) receives the subframes generated by the above-described process, the subframes are aggregated to be an aggregated frame (Agg_Frame) according to an aggregation rule (step S513). Finally, the aggregated frames are transmitted to the wireless network interface card driver 44 for further processing (step S515).

Because a packet error rate occurs when the packets are forwarded through the wireless network communication protocol (e.g., WiFi™), the packets received by the wireless network interface controller may be out of order since the network packets may be re-transmitted or dropped due to the packet error rate. Therefore, the wireless network interface card driver 44 utilizes an aggregation-based RX reorder (ABRR) 441 to order the received aggregated frames (step S517). After that, the information of the IEEE802.3 standard information is filled in the header of the reordered aggregated frames so as to generate the aggregated packets (step S519), and the aggregated packets are forwarded to the de-aggregation unit 46 by the second-layer forwarding unit 45 according to a second-layer forwarding table (step S521). The de-aggregation unit 46 can de-aggregate the aggregated packets into the packets to be forwarded 403 (step S523).

It should be noted that the second-layer forwarding unit 45 is in charge of learning an address of Ethernet data and forwarding the data. In the procedure of forwarding the network packets performed by the second-layer forwarding unit 45, the second-layer forwarding table that records a MAC address table is referred to for forwarding the aggregated packets. The de-aggregation unit 46 de-aggregates the aggregated packets and the de-aggregated packets are then forwarded to a destination-end wireless network interface card. Through the above flowcharts of the method for forwarding aggregated packets described in FIG. 3 and FIG. 5 according to certain embodiments of the present disclosure, the wireless network interface card driver 44 processes the received data frames for aggregating the network packets into the aggregated packets, and therefore the transmission efficiency of the circuit system that is operated in an access point can be proportionally improved based on the quantity of the packets to be aggregated.

It should be noted that, in the step of reordering the aggregated frames by the aggregated RX reorder (ABRR), for avoiding out-of-order of the aggregated frames and reducing complexity of the aggregated RX reorder 441, the aggregated frames generated by the RX aggregation unit 43 should satisfy the characteristics as follows. For example, the packet forwarders recorded in the headers of the aggregated frames should belong to a same wireless network base station (STA) for ensuring that the aggregated packets can be reordered in the wireless network base station as a unit; and the sequence numbers recorded in the headers of the aggregated frames should be continuous for reducing complexity of the aggregated RX reorder 441.

The wireless network communication protocol is such as WiFi™. The aggregate MAC protocol data unit (A-MPDU) is used to aggregate the multiple MPDU data frames that belong to the same wireless network base station. Both the de-aggregation information and the IEEE802.3 standard MSDU data frames are transmitted together for reducing additional protocol overhead. Accordingly, because the complexity of the wireless network communication protocol can be reduced, the performance of the wireless network can be improved since the processor load being increased due to the complexity of the wireless network communication protocol during the network packets are forwarded can be reduced.

However, since the wireless network is with a packet error rate, continuity of the WLAN sequence numbers of the aggregated MPDU (A-MPDU) data frames received by the receiver (RX) of the circuit system cannot be guaranteed. A packet-aggregation unit (such as the packet-aggregation unit 212 of FIG. 2) at the receiver (RX) of the circuit system performs packet aggregation according to the aggregation rules listed below for ensuring that the WLAN sequence numbers of data frames of the aggregated packets are continuous and belonging to the same wireless network base station.

The above-mentioned aggregation rules followed by the receiver-end packet aggregation unit include:

First, only the MPDU data frames belonging to the same wireless network base station can be combined into the same aggregated frames.

Second, only the IEEE802.11 standard MPDU data frames (e.g., the aggregated MSDU data frames or non-aggregated MSDU data frames) or the IEEE802.3 standard MPDU data frames can be combined into the aggregated data frames.

Third, only the IEEE802.11 standard frame-type being the data frames, but not being the null IEEE802.11 standard MPDU data frames, can be combined into the aggregated frames.

Fourth, only the IEEE802.11 standard MPDU data frames with continuous sequence numbers can be in the same aggregated frames, and the MSDU data frames in the aggregated MSDU data frames can be regarded as the IEEE802.11 standard data frames with the same sequence number.

Fifth, the MSDU data frames belonging to the same aggregated MSDU data frames will be in the same aggregated frames.

Sixth, the conditions that can abort the in-progress aggregation procedure at the receiver (RX) of the circuit system are as follows.

In a first scenario, the aggregation procedure will be aborted when a quantity of the IEEE802.11 standard MPDU data frames (e.g., aggregated MSDU data frames or non-aggregated MSDU data frames) in an aggregated frame or the IEEE802.3 standard MPDU data frames meets an upper limit of quantity.

In a second scenario, the aggregation procedure will be aborted when a total length of all of the subframes and the padding bits in an aggregated frame at RX meets another upper limit of length.

In a third scenario, when the queue at the receiver (RX) of the media access control (MAC) is empty, the aggregation procedure will be aborted.

Figure 6:
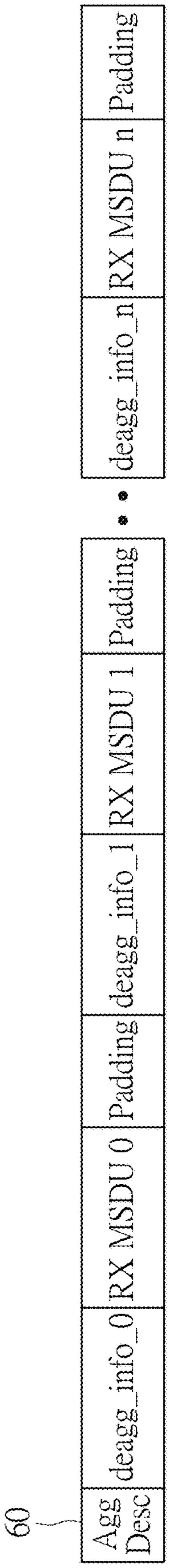
FIG. 6 shows an exemplary example of a content recorded in compliance with a format of an aggregated frame.

Next, when the method for forwarding aggregated packets is operated, the content recorded in the aggregated frame (Agg_Frame) is as an exemplary example shown in FIG. 6.

In the figure, the symbol “n” denotes a quantity of subframes of the aggregated frame, and each of the subframes consists of four fields such as “Agg Desc”, “deagg_info”, “RX MSDU” and “padding.” The field “Agg Desc” (aggregation descriptor) 60 provides aggregation information of the subframes and the aggregation information is referred to for the wireless network interface card driver (WNIC driver) to process the packets. The possible fields of part of the aggregation information are as follows.

The field “RX_AGG_EN” is used to label whether the data frame is an aggregated frame. For example, if the field “RX_AGG_EN” equals to “0”, “RX_AGG_EN=0” denotes that the data frame is a single MSDU data frame, but is not an aggregated frame. The field “RX_AGG_TOTAL_LEN” is used to record a total length in bytes of the aggregated frame. The field “RX_AGG_MSDU_NUM” is used to record a quantity of the data frames of the aggregated frame. The field “SEQ_START” is used to record a sequence number of a first data frame. The field “SEQ_END” is used to record a sequence number of a last data frame.

The field “deagg_info” of the subframe is provided for use of the back-end de-aggregation unit. The information in this field “deagg_info” is filled by the RX-cut Aggregate MAC Service Data Unit (AMSDU) (e.g., the element 42 of FIG. 4). The field “deagg_info” can possibly include the fields as follows.

The field “SubFrame Length” is used to record a length in bytes of the subframe. The field “MSDU_last” is used to label whether the data frame is the last one of the MPDU data frames. If the IEEE802.11 standard MPDU data frame is the aggregated MSDU (AMSDU) data frame having “N” MSDU data frames, the fields “MSDU_last” of a first MSDU data frame to an “N−1”th MSDU data frame are zero, and the field “MSDU_last” of an “N”th MSDU data frame is one. The field “RX MSDU” is used record content of the MSDU data frame.

The field “Padding” of the subframe denotes padding bits having a length from 1 to “N=1” that is provided for N-Byte memory alignment for performing more efficient memory access. The field “Padding” can be filled in by an RX aggregation unit.

Further, when the wireless network interface card driver receives the aggregated frames from the wireless network interface, the aggregated RX reorder (ABRR) performs reordering on the data frames for achieving the following tasks.

A first task of the aggregated RX reorder is to reorder the aggregated frames and provide a transmission order for the WLAN packets having sequence numbers. The differences between the first task of the aggregated RX reorder and the conventional RX reorder are as follows. The aggregated RX reorder is in unit of aggregated frame and is used for reordering the aggregated frames according to a sequence number (SEQ_START) of a first data frame and another sequence number (SEQ_END) of a last data frame recorded in a data (RXD).

Figure 7:
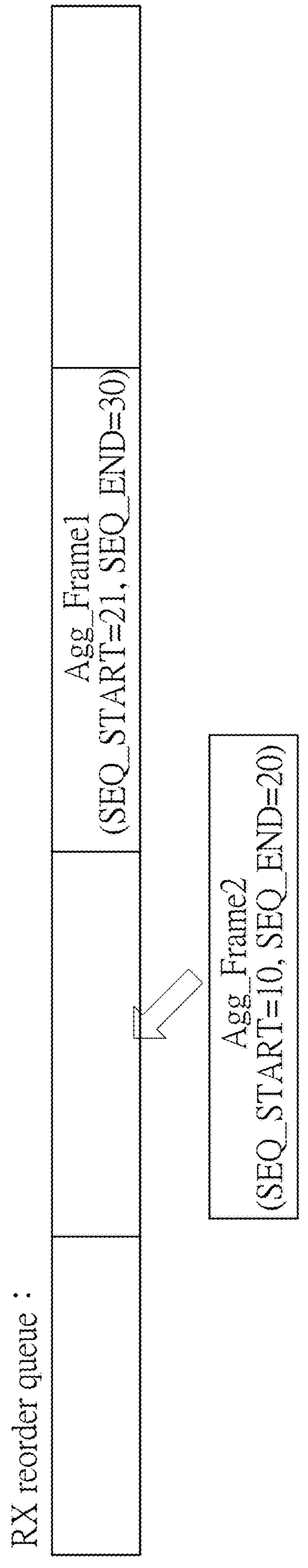
FIG. 7 is a schematic diagram illustrating reordering the aggregated frames according to one embodiment of the present disclosure.

Reference is made to FIG. 7, which is a schematic diagram illustrating reordering the aggregated frames according to one embodiment of the present disclosure. An RX reorder queue is provided in the diagram. If any error occurs in wireless network transmission, the sequence numbers No. 10 to No. 20 IEEE802.11 standard MPDU data frames (SEQ_START=10, SEQ_END=20) in a second aggregated frame (Agg_Frame2) received by the receiver (RX) will be later than the sequence numbers No. 21 to No. 30 IEEE802.11 standard MPDU data frames (SEQ_START=21, SEQ_END=30) in a first aggregated frame (Agg_Frame1) received by the receiver (RX). Accordingly, the aggregated RX reorder of the circuit system firstly places the first aggregated frame (Agg_Frame1) in the reorder queue of the receiver (RX) and waits for forwarding the first aggregated frame (Agg_Frame1) until the aggregated frame Agg_Frame2 is forwarded. The above-described mechanism can overcome the drawbacks that the conventional RX reorder is required to reorder every packet, and therefore improve efficiency of packet forwarding.

A second task of the aggregated RX reorder is to remove the packets that have the same WLAN sequence numbers (WLAN SEQ) with other aggregated frames if the sequence number ranges (SEQ range) of two aggregated frames extracted from the aggregated frames received by the circuit system are overlapped.

Figure 8:
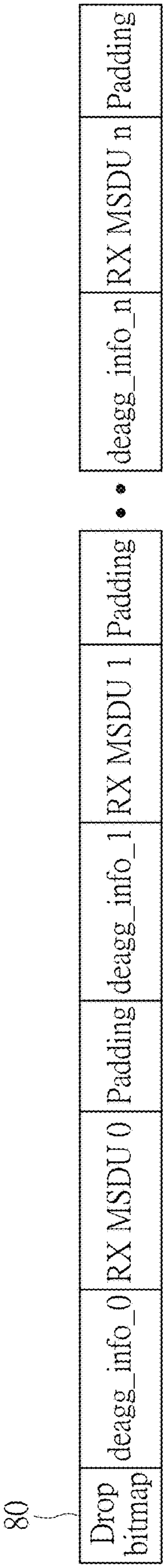
FIG. 8 is a schematic diagram illustrating adding a drop bitmap to a header of the aggregated frames in one embodiment of the present disclosure.

Reference is made to FIG. 8, which is a schematic diagram of dropping the packets within a range of duplicate sequence numbers. In one embodiment of the present disclosure, a drop-bitmap field 80 is added into the header of the aggregated frame. In the reorder procedure, an aggregated RX reorder relies on a sequence number (SEQ_START) of a first data frame of each of the aggregated frames and another sequence number (SEQ_END) of a last data frame to determine the duplicate data frames. The duplicate data frame can be labeled in the header of the aggregated frame. For example, the information of the drop-bitmap field 80 is referred to for a subsequent de-aggregation process, in which the de-aggregation unit drops the duplicate data frames. However, it is unnecessary for the circuit system to conduct the above-described packet-dropping mechanism using the drop-bitmap field 80 since the circuit system can ignore the problem that the performance is reduced due to repeatedly forwarding the same packets.

In conclusion, according to the above embodiments of the method for forwarding aggregated packets and the circuit system, the circuit system is operated in a network device, and the method implements a forwarding mechanism for the aggregated packets, by which the packets with the same characteristics can be aggregated to be aggregated packets and the aggregated packets are forwarded. Therefore, the method allows the packets to be forwarded more efficiently for reducing a packet-forwarding rate, and the circuit system can be adapted to the network device with a limited storage space and lower computing performance. The packet-aggregation-based reorder procedure is also introduced in the aggregated packets forwarding mechanism for efficiently reordering the aggregated packets under characteristics of the wireless local area network with a packet error rate. Furthermore, the complexity of the aggregated RX reorder can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for forwarding aggregated packets, operated in a circuit system, wherein the method comprises:

receiving multiple data frames;

converting the multiple converting the multiple data frames to be in compliance with a unified wireless local area network standard, and performing an aggregation procedure for adding de-aggregation information into a header of the data frames so as to form multiple aggregated frames;

performing a reorder procedure on the multiple aggregated frames based on sequence numbers of the multiple aggregated frames;

sequentially outputting the reordered multiple aggregated frames and performing a second-layer forwarding procedure; and de-aggregating the multiple aggregated frames after the second-layer forwarding procedure is performed on the aggregated frames so as to generate packets to be forwarded.

2. The method according to claim 1, wherein, in the reorder procedure, the circuit system checks whether or not any duplicate data frame exists in each of the multiple aggregated frames; if any duplicate data frame exists, the duplicate data frame is labeled in the header for being ignored when de-aggregation is performed.

3. The method according to claim 2, wherein, in the reorder procedure, the circuit system relies on sequence numbers of a first data frame and a last data frame of each of the aggregated frames to determine the duplicate data frame.

4. The method according to claim 1, wherein the second-layer forwarding procedure is performed by a processor of the circuit system or by a wireless network interface controller operated at an output end of a network device.

5. The method according to claim 1, wherein the aggregation procedure is aborted when a quantity of the data frames to be aggregated at one time meets an upper limit of quantity, or a total length of all of the data frames to be processed at one time meets an upper limit of length.

6. The method according to claim 1, wherein network packets of the data frames in accordance with a wireless network communication protocol are parsed for acquiring a destination network address and determining a forwarding route for the network packets to be forwarded according to a routing algorithm.

7. The method according to claim 1, wherein, when the multiple data frames are converted to the unified wireless local area network standard, the circuit system checks whether or not the IEEE802.11 standard data frames are Aggregate MAC Service Data Unit (AMSDU) data frames; wherein, if the IEEE802.11 standard data frames are determined to be the AMSDU data frames, the AMSDU data frames are de-aggregated to multiple IEEE802.3 standard MAC Service Data Unit (MSDU) data frames; if the IEEE802.11 standard data frames are not the AMSDU data frames, the IEEE802.11 standard data frames are converted to IEEE802.3 standard MAC Service Data Unit (MSDU) data frames.

8. The method according to claim 7, wherein the de-aggregation information is added to the header of each of the IEEE802.3 standard MSDU data frames so as to generate a subframe that combines the de-aggregation information and the IEEE802.3 standard MSDU data frame.

9. The method according to claim 8, wherein, when multiple subframes are generated, an aggregation circuit relies on an aggregation rule to aggregate the multiple subframes to be the aggregated frame.

10. A circuit system for performing an aggregation procedure, comprising:

a wireless network interface controller used to perform packet conversion and packet aggregation; and a wireless network interface card driver, connected with the wireless network interface controller, used to perform a frame-based reorder procedure on the aggregated frames that are out-of-order;

wherein the circuit system performs a method for forwarding aggregated packets, comprising:

receiving, by the wireless network interface controller, multiple data frames, converting the multiple converting the multiple data frames to be in compliance with a unified wireless local area network standard, and performing an aggregation procedure for adding de-aggregation information into a header of the data frames so as to form multiple aggregated frames;

performing, by the wireless network interface card driver, a reorder procedure on the multiple aggregated frames based on sequence numbers of the multiple aggregated frames;

sequentially outputting the reordered multiple aggregated frames and performing a second-layer forwarding procedure; and de-aggregating the multiple aggregated frames after performing the second-layer forwarding procedure on the aggregated frames so as to generate packets to be forwarded.

11. The circuit system according to claim 10, wherein circuit system uses a reorder to perform the reorder procedure and the circuit system checks whether or not any duplicate data frame exists in each of the aggregated frames in the reorder procedure; if any duplicate data frame exists, the duplicate data frame is labeled in the header for being ignored when de-aggregation is performed.

12. The circuit system according to claim 11, wherein the reorder relies on sequence numbers of a first data frame and a last data frame of each of the aggregated frames to determine the duplicate data frame.

13. The circuit system according to claim 10, wherein the second-layer forwarding procedure is performed by a processor of the circuit system or by a wireless network interface controller operated at an output end of a network device.

14. The circuit system according to claim 10, wherein the aggregation procedure is performed only on data-type data frames, the circuit system sets an upper limit of quantity for performing aggregation on a certain quantity of the data frames at one time and an upper limit of length for a total length of all of the data frames to be processed; and the aggregation procedure is aborted when the quantity of the data frames to be aggregated at one time meets the upper limit of quantity, or the total length of all of the data frames to be processed at one time meets the upper limit of length.

15. The circuit system according to claim 10, wherein the wireless network interface controller is disposed at a receiver of the circuit system and receives the IEEE802.11 standard MAC protocol data unit (MPDU) data frames via a wireless network interface.

16. The circuit system according to claim 15, when the multiple data frames are converted to the unified wireless local area network standard, the circuit system checks whether or not the IEEE802.11 standard data frames are Aggregate MAC Service Data Unit (AMSDU) data frames; wherein, if the IEEE802.11 standard data frames are determined to be the AMSDU data frames, the AMSDU data frames are de-aggregated to multiple IEEE802.3 standard MAC Service Data Unit (MSDU) data frames; if the IEEE802.11 standard data frames are not the AMSDU data frames, the IEEE802.11 standard data frames are converted to IEEE802.3 standard MAC Service Data Unit (MSDU) data frames.

17. The circuit system according to claim 16, wherein the de-aggregation information is added to the header of each of the IEEE802.3 standard MSDU data frames so as to generate a subframe that combines the de-aggregation information and the IEEE802.3 standard MSDU data frame.

18. The circuit system according to claim 17, wherein, when multiple subframes are generated, an aggregation circuit relies on an aggregation rule to aggregate the multiple subframes to be the aggregated frame, and the aggregated frames are transmitted to the wireless network interface card driver for further processing.

19. The circuit system according to claim 10, wherein the circuit system operates an embedded system that performs a wireless network communication protocol for implementing a packet-aggregation mechanism belonging to a wireless local area network.

20. The circuit system according to claim 19, wherein network packets of the data frames in accordance with a wireless network communication protocol are parsed for acquiring a destination network address and determining a forwarding route for the network packets to be forwarded according to a routing algorithm.

* * * * *